(12) United States Patent
Bowers et al.

(10) Patent No.: US 6,456,751 B1
(45) Date of Patent: *Sep. 24, 2002

(54) FEEDBACK STABILIZATION OF A LOSS OPTIMIZED SWITCH

(75) Inventors: John Edward Bowers, Santa Barbara, CA (US); Roger Jonathon Helkey, Montecito, CA (US)

(73) Assignee: Calient Networks, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/548,587

(22) Filed: Apr. 13, 2000

(51) Int. Cl.[7] .................................. G02B 6/26

(52) U.S. Cl. ....................................... 385/16

(58) Field of Search ................. 385/16, 17, 18, 385/22, 20, 24, 30–33, 39, 52, 126, 127, 42, 48, 147; 359/153–156; 250/227.14, 227.19, 227.24

(56) References Cited

U.S. PATENT DOCUMENTS

| 2,982,859 A | 5/1961 | Steinbrechner |
| 3,492,484 A | 1/1970 | Iti |
| 3,990,780 A | 11/1976 | Dakss |
| 4,003,655 A | 1/1977 | Wasilko |
| 4,053,845 A | 10/1977 | Gould |
| 4,208,094 A | 6/1980 | Tomlinson, III et al. |
| 4,234,145 A | 11/1980 | Leiboff |
| 4,243,297 A | 1/1981 | Elion |

(List continued on next page.)

FOREIGN PATENT DOCUMENTS

| DE | 4224601 A1 | 1/1994 |
| EP | 1 120677 A2 | 8/2001 |
| EP | 1 120989 A1 | 8/2001 |
| GB | 2 175 705 A | 12/1986 |
| JP | 60-107017 | 6/1985 |
| JP | 5-107485 A | 4/1993 |
| JP | 6-180428 | 6/1994 |
| WO | WO 01/33898 A2 | 5/2001 |
| WO | WO 01/39413 A2 | 5/2001 |

OTHER PUBLICATIONS

Lin Y. Lin and Evan L. Goldstein, "Micro–Electro–Mechanical Systems (MEMs) for WDM Optical–Crossconnect Networks," IEEE, pp. 954–957 (1999).

Erwin Kreyszig, "Advanced Engineering Mathematics," 8th Edition, John Wiley & Sons, Inc., pp. 990–1008 (1999).

Janusz Bryzek, Kurt Petersen, & Wendell McCulley, "Micromachines on the March," IEEE Spectrum, pp. 20–31 (May 1994).

(List continued on next page.)

Primary Examiner—Akim E. Ullah
(74) Attorney, Agent, or Firm—Blakley, Sokoloff, Taylor & Zafman LLP

(57) ABSTRACT

A system is provided to obtain loss optimized output optical power by way of feedback control and stabilization in an optical signal switching or routing system. The optical signal switching or routing system includes at least two input optical fibers and at least two output optical fibers, a controllable mechanism for directing an optical beam from one of the input optical fibers to one of the output optical fibers, and a mechanism for measuring the optical power applied to output optical fiber. The measuring mechanism provides a measure of the output optical power through a signal processing apparatus to a control apparatus. Possible other inputs to the signal processing apparatus include the input optical power, test optical power, etc. The inputs to the signal processing apparatus are compared and the signal processing apparatus outputs a signal to the control apparatus to provide optimized output power.

11 Claims, 6 Drawing Sheets

U.S. PATENT DOCUMENTS

| | | |
|---|---|---|
| 4,302,071 A | 11/1981 | Winzer |
| 4,303,303 A | 12/1981 | Aoyama |
| 4,322,126 A | 3/1982 | Minowa et al. |
| 4,365,863 A | 12/1982 | Broussaud |
| 4,421,381 A | 12/1983 | Ueda et al. |
| 4,431,258 A | 2/1984 | Fye |
| 4,432,599 A | 2/1984 | McMahon |
| 4,452,506 A | 6/1984 | Reeve et al. |
| 4,470,662 A | 9/1984 | Mumzhiu |
| 4,474,423 A | 10/1984 | Bisbee et al. |
| 4,498,730 A | 2/1985 | Tanaka et al. |
| 4,512,036 A | 4/1985 | Laor |
| 4,603,975 A | 8/1986 | Cinzori |
| 4,626,066 A | 12/1986 | Levinson |
| 4,644,160 A | 2/1987 | Arimoto et al. |
| 4,677,290 A | 6/1987 | Mitch |
| 4,696,062 A | 9/1987 | LaBudde |
| 4,728,169 A | 3/1988 | Campbell et al. |
| 4,746,195 A | 5/1988 | Auracher |
| 4,758,061 A | 7/1988 | Horn |
| 4,789,215 A | 12/1988 | Anderson et al. |
| 4,823,402 A | 4/1989 | Brooks |
| 4,848,999 A | 7/1989 | Taylor |
| 4,866,699 A | 9/1989 | Brackett et al. |
| 4,892,388 A | 1/1990 | Taylor |
| 4,893,935 A | 1/1990 | Lee |
| 4,927,221 A | 5/1990 | Kiyono |
| 4,932,745 A | 6/1990 | Blonder |
| 4,953,155 A | 8/1990 | Tangonan et al. |
| 4,993,796 A | 2/1991 | Kapany et al. |
| 5,030,044 A | 7/1991 | Grant et al. |
| 5,031,987 A | 7/1991 | Norling |
| 5,077,622 A | 12/1991 | Lynch |
| 5,083,857 A | 1/1992 | Hornbeck |
| 5,097,354 A | 3/1992 | Goto |
| 5,150,245 A | 9/1992 | Smithgall |
| 5,172,262 A | 12/1992 | Hornbeck |
| 5,177,348 A | 1/1993 | Laor |
| 5,204,922 A | 4/1993 | Weir et al. |
| 5,255,332 A | 10/1993 | Welch et al. |
| 5,291,324 A | 3/1994 | Hinterlong |
| 5,383,118 A | 1/1995 | Nguyen |
| 5,420,946 A | 5/1995 | Tsai |
| 5,440,654 A | 8/1995 | Lambert, Jr. |
| 5,444,566 A | 8/1995 | Gale et al. |
| 5,450,512 A | 9/1995 | Asakura |
| 5,471,332 A | 11/1995 | Shiragaki et al. |
| 5,488,862 A | 2/1996 | Neukermans et al. |
| 5,524,153 A * | 6/1996 | Laor ............................. 385/16 |
| 5,555,558 A | 9/1996 | Laughlin |
| 5,621,829 A | 4/1997 | Ford |
| 5,627,669 A | 5/1997 | Orino et al. |
| 5,629,790 A | 5/1997 | Neukermans et al. |
| 5,629,993 A | 5/1997 | Smiley |
| 5,647,033 A | 7/1997 | Laughlin |
| 5,673,139 A | 9/1997 | Johnson |
| 5,796,880 A | 8/1998 | Ford et al. |
| 5,832,415 A | 11/1998 | Wilkening et al. |
| 5,872,880 A | 2/1999 | Maynard |
| 5,900,983 A | 5/1999 | Ford et al. |
| 5,920,417 A | 7/1999 | Johnson |
| 5,960,132 A | 9/1999 | Lin |
| 5,960,133 A | 9/1999 | Tomlinson |
| 6,002,818 A | 12/1999 | Fatehi et al. |
| 6,044,705 A * | 4/2000 | Neukermans et al. ..... 73/504.02 |
| 6,049,412 A | 4/2000 | Bergmann et al. |
| 6,097,858 A * | 8/2000 | Laor ............................. 385/16 |
| 6,097,859 A | 8/2000 | Solgaard et al. |
| 6,097,860 A * | 8/2000 | Laor ............................. 385/17 |
| 6,101,299 A * | 8/2000 | Laor ............................. 385/16 |
| 6,137,926 A | 10/2000 | Maynard |
| 6,201,622 B1 | 3/2001 | Lobbett et al. |
| 6,208,469 B1 | 3/2001 | Matsuura |
| 6,222,679 B1 | 4/2001 | Nevis |
| 6,236,481 B1 | 5/2001 | Laor |
| 6,249,626 B1 | 6/2001 | Bergmann |
| 6,253,001 B1 | 6/2001 | Hoen |
| 6,253,010 B1 | 6/2001 | Belser et al. |
| 6,256,430 B1 | 7/2001 | Jin et al. |
| 6,278,812 B1 | 8/2001 | Lin et al. |
| 6,289,145 B1 | 9/2001 | Solgaard et al. |
| 6,295,154 B1 | 9/2001 | Laor et al. |
| 6,320,998 B1 | 11/2001 | Okayama et al. |
| 6,330,102 B1 | 12/2001 | Daeman et al. |

OTHER PUBLICATIONS

Ming C. Wu, "MEMS for Optical and RF Applications." UCLA Ectension, Department of Engineering, Information Systems and Technical Management, Engineering: 823.52, Nov. 1–3, 1999.

"Lucent's New All–Optical Router Uses Bell Labs Microscopic Mirrors," Bells Labs press release, pp. 1–4, Nov. 10, 1999. http://wwwbell–labs.com/news/1999/november/10/1.html.

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum,, L. Zhang, and C.R. Giles, "Fully Provisional 112 x 112 Micro–Mechanical Optical Crossconnect With 35.8Tb/s Demonstrated Capacity," OFC 2000 Tech. Dig., Baltimore, Maryland, pp. 202–204 (Mar. 7–10, 2000).

* cited by examiner

FEEDBACK STABILIZATION OF A LOSS OPTIMIZED SWITCH

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to the field of fiber optics, and more particularly to the field of optical signal switching, routing, and monitoring.

2. Description of Related Art

FIG. 1 is an illustration of an exemplary optical switching system 10 for practicing the invention. For example, optical switching system 10 may represent a 3-dimensional optical switching system. A 3-dimensional optical switching system allows for optical coupling between input fibers and output fibers in different planes using lens arrays and mirror arrays. The lens arrays and mirror arrays provide proper angle and position of light beams traveling from input fibers to output fibers. That is, a light beam must leave and enter a fiber in a direct, beam path.

Referring to FIG. 1, a generalized optical switching system 10 includes input fiber array 12, first lens array 14, first beam steering apparatus (e.g., Micro-Electro-Mechanical-System, or MEMS, mirror array) 16, second beam steering apparatus (e.g., MEMS mirror array) 18, second lens array 20, and output fiber array 22. System 10 might also include additional or different elements, such as apparatus 24 and 26 for controlling the mirror arrays 16 and 18, respectively.

Input fiber array 12 provides a plurality of input optical fibers 28 for forming light beams 30 transmitted to (and through) first lens array 14. First lens array 14 includes a plurality of optical lenses 32, which are used to focus beams of light from each input optical fiber 28 to individual mirror devices 34 on mirror array 16. Mirror devices 34 may be electronically, magnetically, or otherwise individually movable to control the beam path of each beam formed by the input optical fibers 28.

Mirror device 34 may be a gimbaled mirror device having a rectangular, elliptical, circular, or other appropriate shape. The plurality of mirror devices 34 for mirror array 16 can pivot a reflective component thereof (not specifically shown in FIG. 1) to redirect or reflect light to varying mirror devices on second mirror array 18. Second mirror array 18 also includes a plurality of mirror devices, similar to those described with regard to first mirror array 16, which are used to redirect and reflect light beams to varying lenses 36 on second lens array 20. second lens array 20 focuses beams of light from second mirror array 18 t o individual output fibers 38 of output fiber array 22.

Optical switching system 10 allows light beams from any input fiber 28 of input fiber array 12 to be redirected t o any output fiber 38 of output fiber array 22. The above arrangement, including mirror arrays 16, 18 may also be used in scanning systems, printing systems, display systems, and other systems that require redirecting beams 20 of light.

It should be noted that for each input optical fiber 28 there is an associated mirror device (such as mirror de vice 34) on mirror array 16, and for each output optical fiber 38 there is an associated mirror device on mirror array 18. In general, there will be a minimum of two input optical fibers and two output optical fibers, and correspondingly two mirrors on each of arrays 16 and 18. There need not be an identical number of input and output optical fibers, although this is typically the case. Also, there will typically be more than two such input and output optical fibers.

In general, many types of beam steering arrangements will lend themselves to use with the present invention. For example, two mirror arrays 16, 18 are shown in FIG. 1. Good coupling of a beam into an output optical fiber typically requires controlling fiber position and angle in two dimensions, in addition to the two dimensions of mirror rotation. So, four degrees of freedom are required. However, in some instances, few or greater degrees of freedom may suffice. For example, a one-mirror array shown FIG. 2, where a single mirror array 42 controlled by apparatus 44 is used for directing the beams, or a three or more mirror array arrangement (not shown) may be appropriate. Also, while the above description has been in terms of reflective beam steering, other types of beam steering, such as refractive or diffractive beam steering may employ the present invention with equal advantage (although not otherwise discussed in detail herein).

Coupling a light beam from an input optical fiber to an output optical fiber requires that the mirrors of mirror arrays 16, 18 be angularly controlled, and that the mirror angles be precise. Such precision, and a degree of control thereover, is needed to optimize output optical power. To obtain such precise positioning, one can either employ or not employ knowledge of actual mirror angle. One method to determine the mirror angles is to add structures to the mirrors that indicate the angle of mirror rotation. One example of this is torsion sensors attached to suspension elements associated with each mirror. See, for example, U.S. Pat. No. 6,044,705. This approach has several disadvantages, including a relatively large number of required interconnections, added processing and manufacturing steps, greater risk of yield losses, etc.

BRIEF SUMMARY OF THE INVENTION

The present invention recognizes the limitations of direct measurement of mirror position, and presents an alternative technique for allowing optimization of output optical power. Our approach is to use an optical signal incident on each mirror to determine the mirror's angle. According to one embodiment, the output optical power is measured, for example at each output optical fiber, and compared with either the input optical power or a reference value, and based on the results of the comparison, a mirror or mirrors are rotated, and output power measured again. This process is referred to herein as feedback stabilization control of mirror position. According to another embodiment, this may be an iterative process, to allow narrowing in on a desired mirror angle for loss optimized output optical power.

BRIEF DESCRIPTION OF THE SEVERAL VIEWS OF THE DRAWING

The features and advantages of the present invention are described and will be apparent to those skilled in art from the following detailed description taken together with the accompanying figures, in which like reference numerals in the various figures denote like elements.

DETAILED DESCRIPTION OF THE INVENTION

The present invention will now be described in detail with reference to examples thereof. However, such examples are for illustrative purposes, and should not be read as limiting the present invention, the scope of which being defined by the claims hereof.

Figure 1:
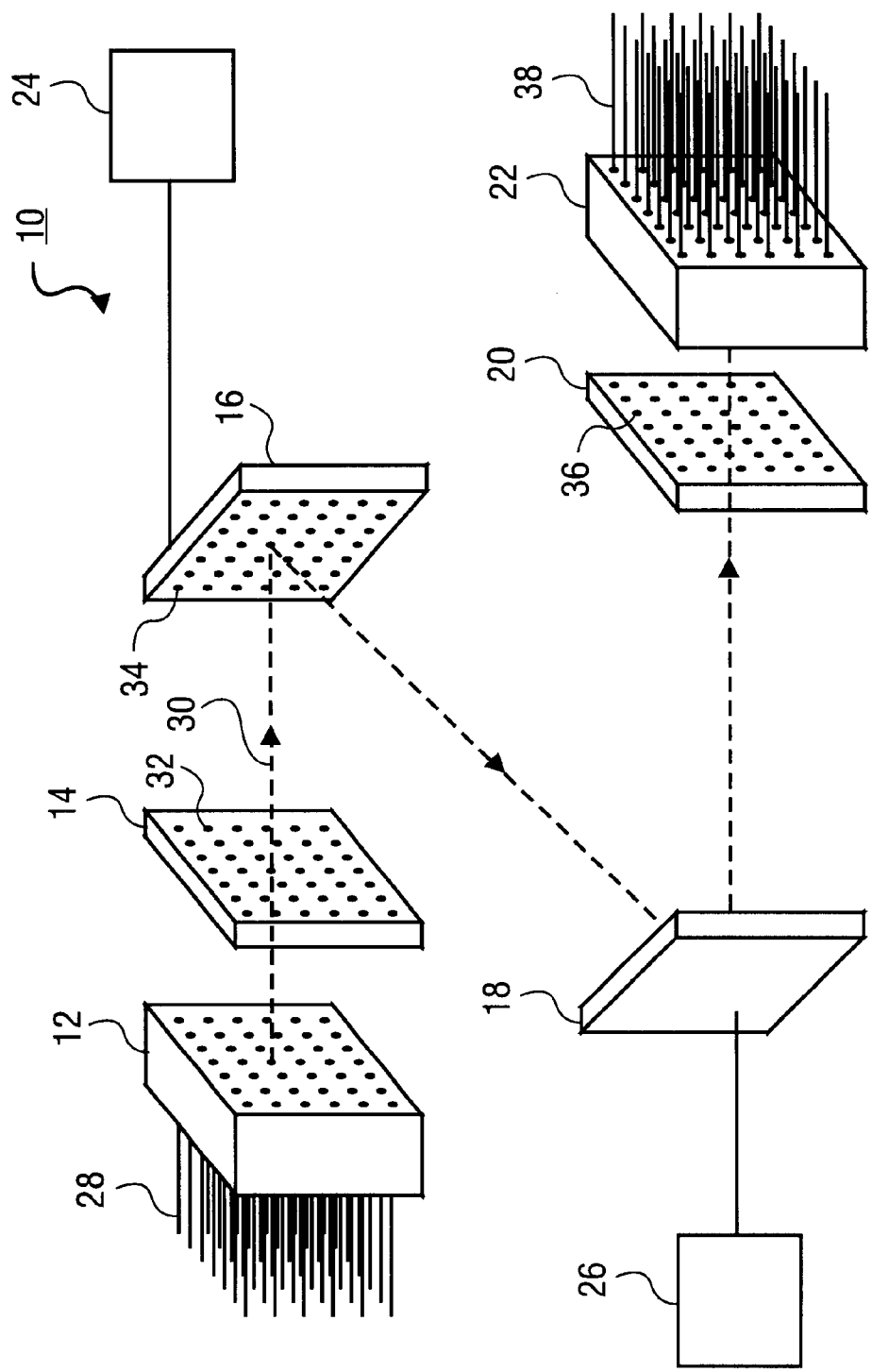
FIG. 1 is an illustration of a prior art optical switching apparatus employing multiple reflective devices according to the prior art.
Figure 2:
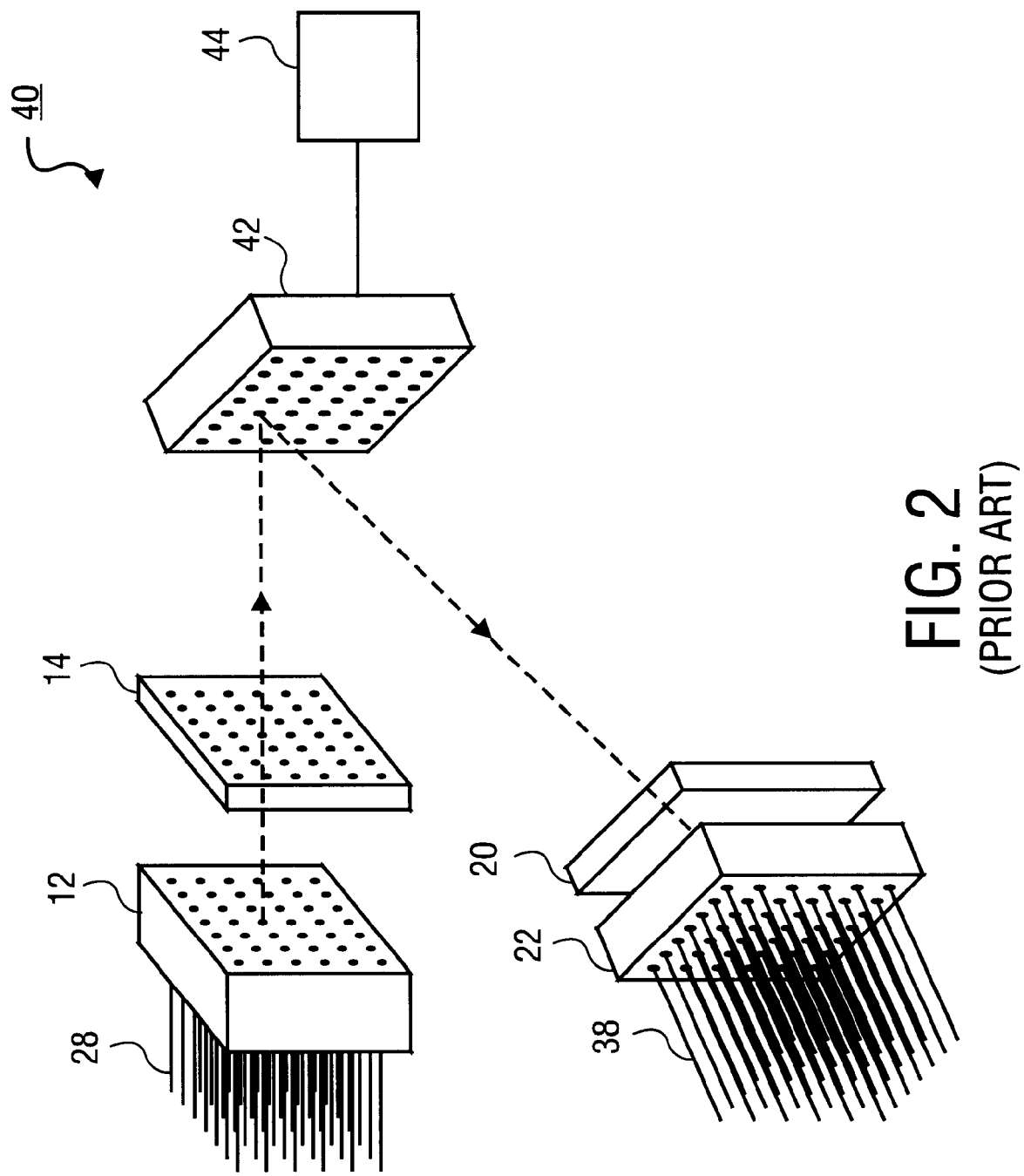
FIG. 2 is an illustration of a prior art optical switching apparatus employing a single reflective device according to the prior art.
Figure 3:
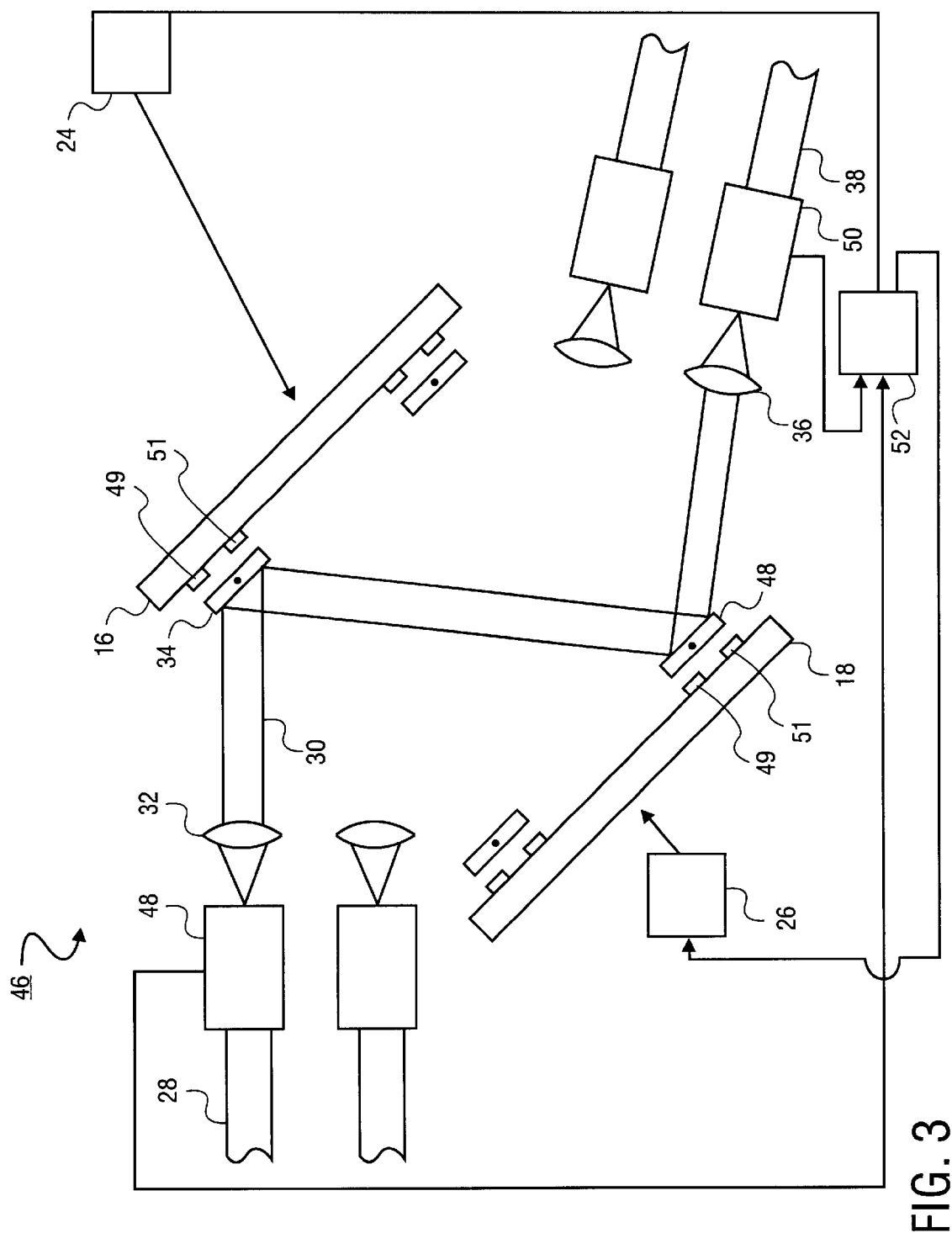
FIG. 3 is an illustration of an optical system according to the present invention.

With reference to FIG. 3, there is shown therein a system 46 suitable for implementation of one embodiment of the present invention. For illustration purposes only, there is shown only two input and output optical fibers, although it will be readily understood that the present description applies equally to a virtually arbitrary greater number of such fibers. In one embodiment lenses 32 may be formed from an ACT Microdevices 8-fiber collimator array (ACT Microdevices, Radford, Va.). System 46, in addition to those elements discussed with reference to FIG. 1, further includes input optical power measurement apparatus 48 associated with each input optical fiber 28 and output optical power measurement apparatus 50 associated with each output optical fiber 38, each optical power measurement apparatus providing output signals representative of measured optical power. System 46 further including a signal processing apparatus 52, connected to receive as inputs the output signals provided by optical power measurement devices 48 and 50. Signal processing apparatus 52 provides output signals which are representative of a calculated comparison of the input optical power measured by optical power measurement apparatus 48 and output optical power measured by optical power measurement apparatus 50. These signals are used by mirror control apparatus 24, 26 to, for example, generate voltages which applied to electrodes such as 49, 51, to control the angular position of mirror 34, 48. In one embodiment, mirrors 34, 48 may be composed of CMS Mikrosysteme Mikro-scanner 1.2 mirrors (CMS Mikrosysteme GmbH, Chemnitz, Germany).

As will be further discussed, the calculated comparison may be one of a large number of different types of analytical comparisons. In addition, control apparatus 24 and 26 are configured such that they receive as inputs the output signals from signal processing apparatus 52. System 46 is thereby configured such that an analytical comparison of the input and output optical powers may be made, and the angular position of either mirror 34, mirror 48, or both may be adjusted in response to that analytical comparison in order to optimize output optical power.

The aforementioned analytical comparison is in part a function of the number of degrees of freedom of the system. For example, in the simplest case, mirror 34 might rotate in only one plane, so the mirror control apparatus 24 and/or 26 would have only one output signal for each mirror. Techniques for maximizing or minimizing the output of a single variable are well known, for example using a steepest decent method (see, e.g., E. Kreyszig, 'Advanced Engineering Mathematics', John Wiley & Sons 1993). However, in other systems two variable mirror planes are required for loss optimization, so the mirror controller 24, 26 will have two outputs. This optimization of a function of multiple variables can be done with a variety of techniques, such as random search techniques and gradient search techniques (see, e.g., E. Kreyszig, 'Advanced Engineering Mathematics', John Wiley & Sons 1993). Optimization techniques typically start with a random or periodic search to find a good optimization starting point, then a gradient search to find the local optimum.

It is often desired to optimize a system such as system 46 for minimum loss. In such a case, the analytical comparison will be made such that the loss optimized optical power is the greatest possible optical output power. In such a case, the signal processing apparatus 52 may include a ratio circuit, and serve to calculate the ratio of output optical power to input optical power. The greater the ratio, the greater the output optical power. For example, a ratio of better than one-half would indicate a loss of less than 3 dB. However, it may be desired to have every channel (i.e., the signal on each output optical fiber) of the system have approximately the same optical loss. In this case channels with loss lower than some threshold (e.g., average) might be loss optimized to have less than minimum loss to equalize power to other channels. In other applications, it might be desired to have the same optical output power for every channel. In this case, channels with strong input signals might be loss optimized to have higher loss. It may alternatively be desirable to maintain an individual channel at a preset or calculated power level, for example when the input optical power is subject to power variations. In such a case, the optical power stabilization may be achieved by monitoring fluctuations at the input optical power measure and controlling attenuation so as to stabilize output optical power.

Figure 4:
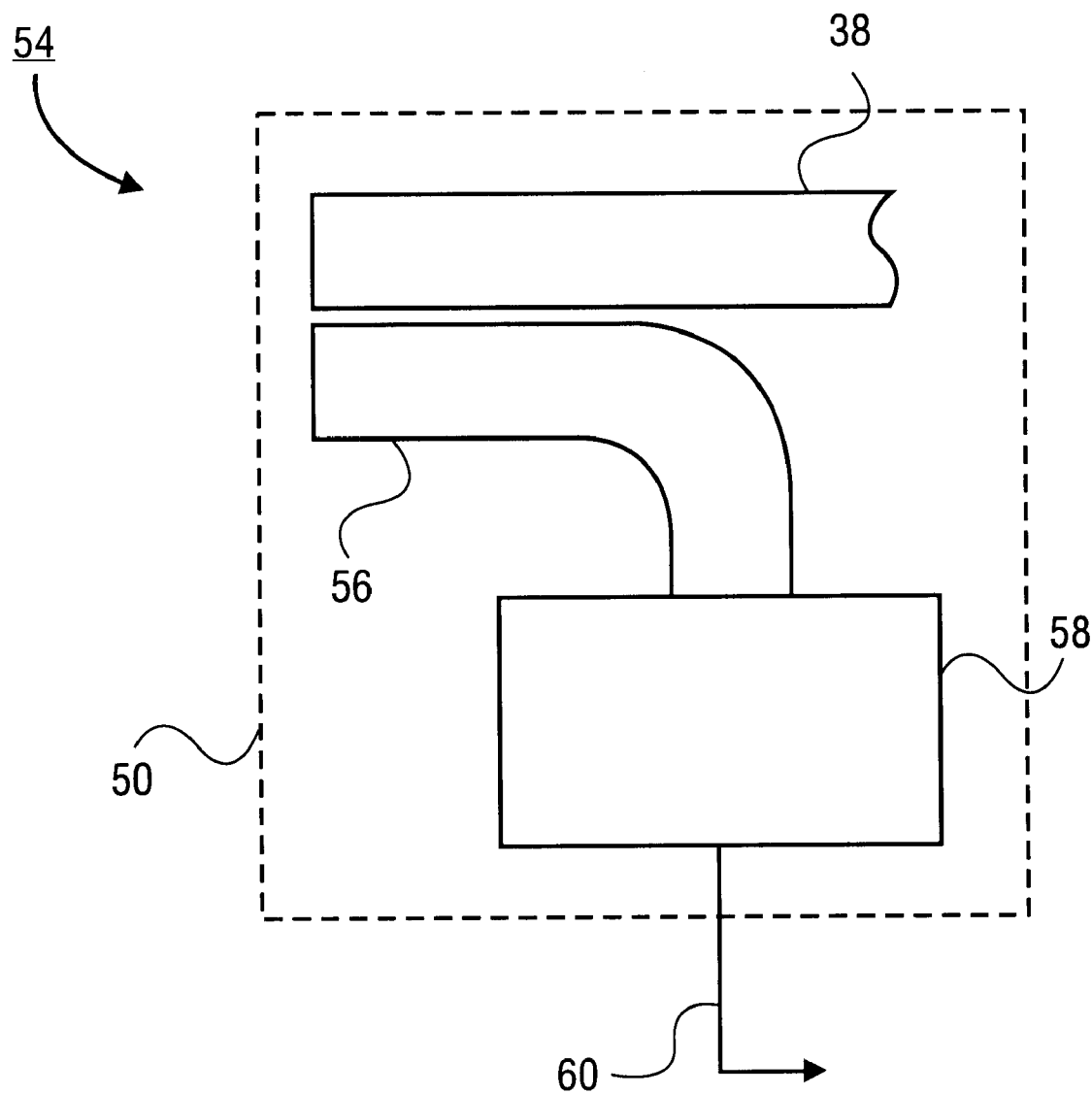
FIG. 4 is an illustration of an optical power measurement apparatus as employed by one embodiment of the present invention.

In one embodiment 54 of the present invention shown in FIG. 4, the power coupled into an output optical fiber 38 is determined by sampling the power in the fiber with a fiberoptic power splitter 56 proximate the output optical fiber, and a photodetector 58 to convert this sampled power to an electrical level, which may be output at output 60. In one embodiment, the fiberoptic power splitter is a ThorLabs #1020A-10 10/90 optical power splitter (ThorLabs, Inc., Newton, N.J.) and the photodetector is an Epitaxx ETX500T8 (Epitaxx Optoelectronic Devices, West Trenton, N.J.).

This measurement of the optical output power is not a direct measurement of optical loss of the system, and fluctuations of input optical power would make it difficult to provide a mirror angle corresponding to an optimized output optical power, whether is be minimum loss or some other optimization. Therefore, in embodiment 46 shown in FIG. 3, the optical loss of the system is measured by sampling the power at the input of the fiber 28, for example by using an optical power splitter 56 and photodetector 58, as shown and described in FIG. 4, at the input optical fiber as well. The optical loss may be found, for example, from the ratio of the output power to the ratio of the input power.

Figure 5:
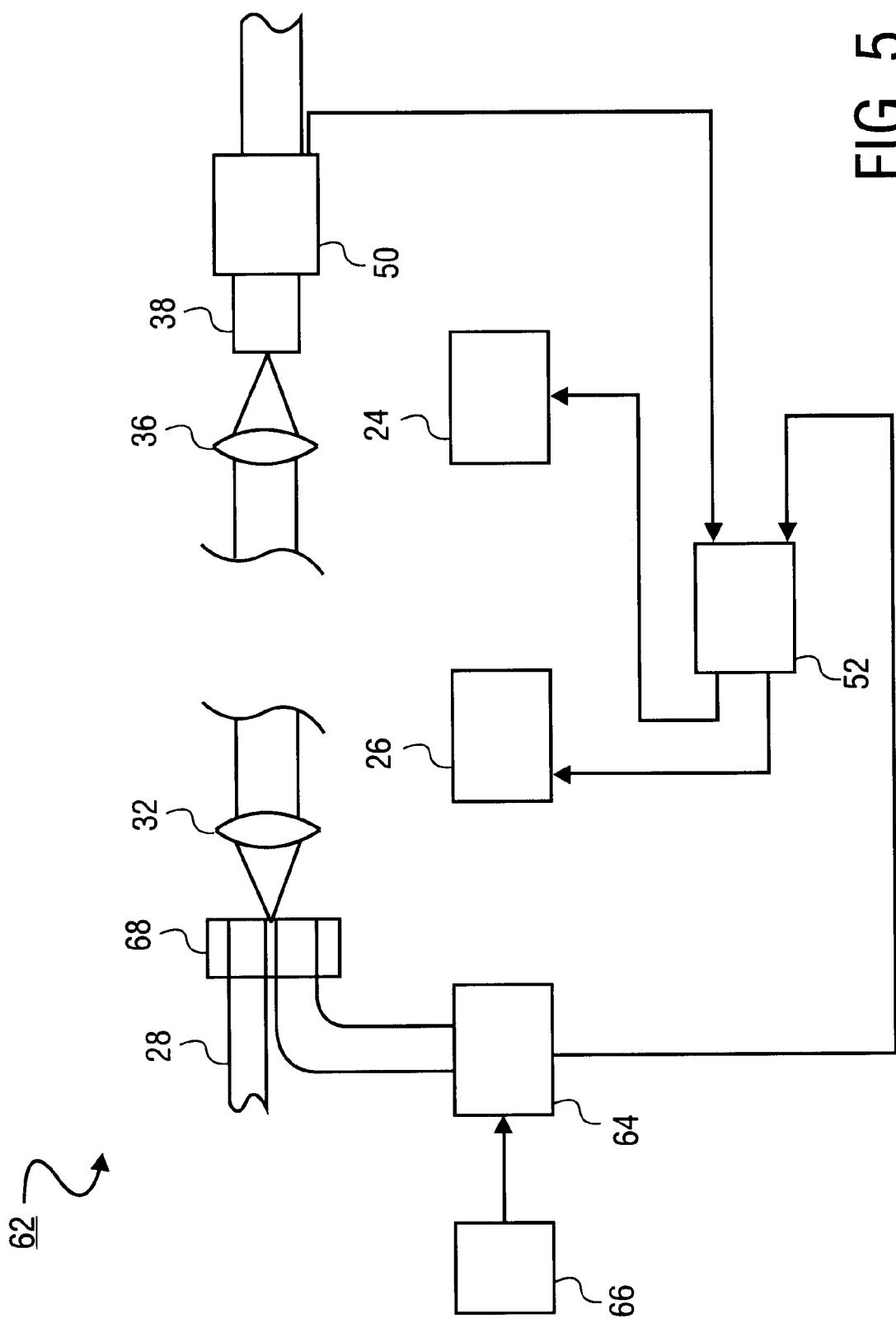
FIG. 5 is an illustration of an optical system according to an alternative embodiment of the present invention.

In the embodiment of FIG. 3, the feedback stabilization relies on the input optical signal delivered by the input optical fiber 28. However, in general, the output optical power is compared to a reference optical power. According to another embodiment 62 of the present invention, the output optical power may be compared to a reference optical power, other than input optical power, and control performed as a function of that comparison. For example, as shown in FIG. 5, an external optical source 64 (such as a Fujitsu FLD148G3NL-B 1.475 nm laser with an optical power splitter to allow one laser to be used with more than one channel, from Fujitsu Compound Semiconductor, Inc., San Jose, Calif.) under separate control 66 is used, for example, through a wavelength division multiplexer fiber coupler 68 (such as model DiCon PCC-14-15 available from DiCon Fiberoptics, Inc., Berkeley, Calif.) as a reference optical power source, having a known or measured optical power. This known or measured optical power may be used as an input to signal processing apparatus 52, which performs the previously discussed analytical comparison to thereby provide control signals to mirror control apparatus 24, 26. Embodiment 62 may serve several different purposes, such as system calibration, etc.

Figure 6:
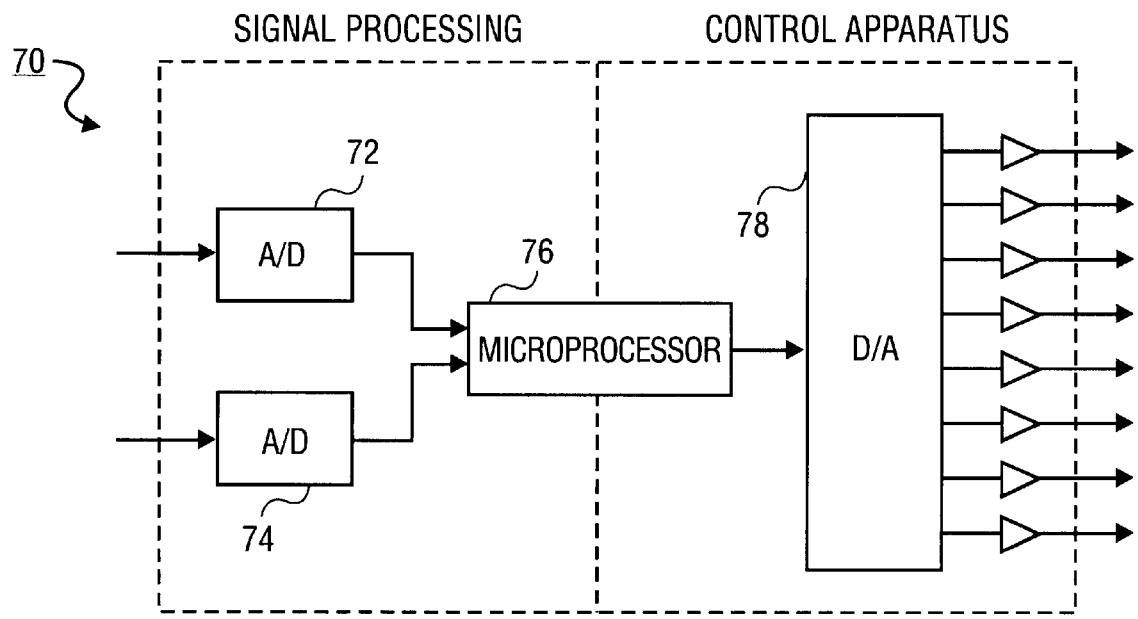
FIG. 6 is an illustration of an official power is computed by two analog to digital converter.

According to an embodiment 70 of the present invention shown in FIG. 6, the ratio of the input to output optical power is computed by two analog to digital (A/D) converters 72, 74 to digitize the input power level and output power level, and a microprocessor 76 to perform the analytical comparison function, such as division. Microprocessor 76 calculates the voltages needed to set the desired mirror angles, and converts this to an analog voltage with multiple digital to analog (D/A) converters 78. In one implementation, the microprocessor is a Microchip PIC16C770 (Microchip Corp., Ariz.) with 6 integrated A/D converters. The microprocessor takes the ratio of the input and output signal level, and computes the new mirror control voltages. The new voltages are sent to a Linear Technology LTC1257 D/A converter (Digi-Key, Thief River Falls, Minn.), with a maximum output voltage of approximately 10 V. The mirrors typically require high voltage to cause mirror deflection. High voltage drivers to increase the voltage for the mirrors can be built using high voltage MOSFET devices using standard commercial practice.

Figure 7:
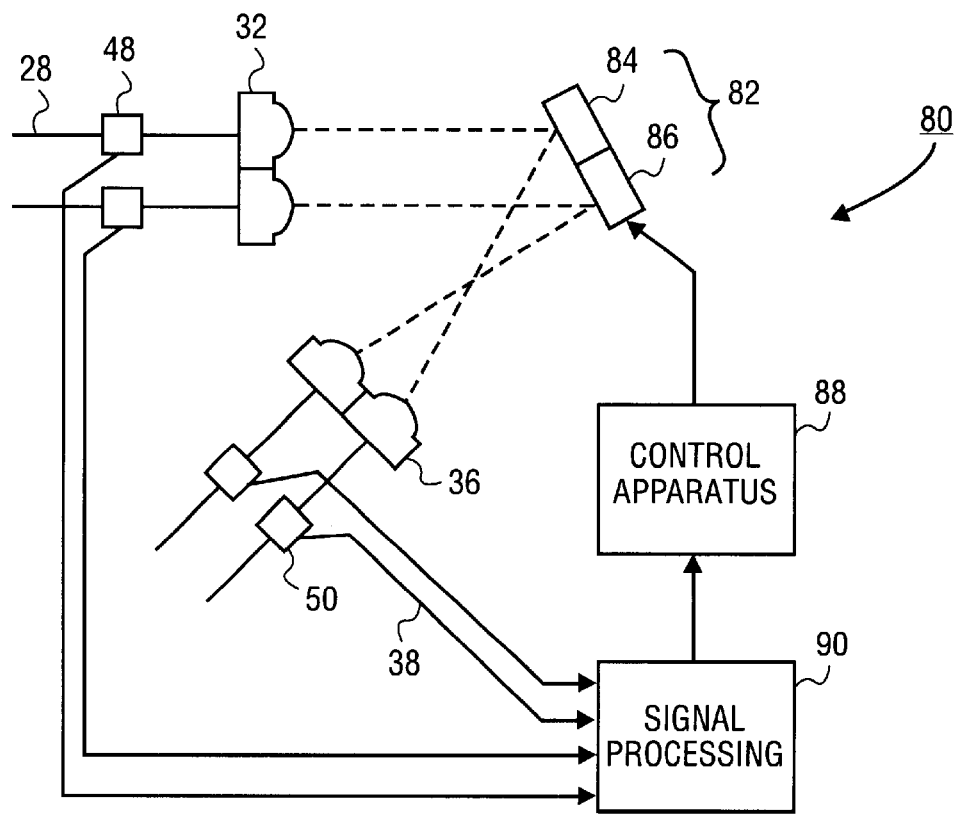
FIG. 7 is an illustration of a single beam steering device.

While the above describes the invention with reference to several specific exemplary embodiments, numerous variations and alternate embodiments are contemplated and will be appreciated by one skilled in the art. For example, with reference to FIG. 7, there is shown therein a simple embodiment 80 in which only a single beam steering apparatus 82 is shown. In embodiment 80, beam steering apparatus 82 consists of two independently controllable beam steering sub-apparatus 84, 86. Signal processing and control are as otherwise previously described. Likewise, an arrangement with more than two beam steering apparatus, although not shown, is merely an extension of the previous description. Thus, the spirit and scope of the present invention will be defined by the appended claims, with no intended limitation thereof by the preceding description.

What is claimed is:

1. An optical system, comprising:
   first and second input optical fibers for producing first and second optical beams, respectively;
   first and second output optical fibers for receiving either the first or second optical beams;
   a control apparatus;
   a beam steering apparatus, responsive to the control apparatus, for independently steering the first and second optical beams to and towards the first and second output optical fibers;
   first and second output optical power measuring apparatus for measuring the optical power of signals received by the first and second output optical fibers, respectively;
   first and second reference optical power sources for providing first and second reference optical power values, respectively;
   a signal processing apparatus, communicatively coupled to the first and second reference optical power sources, the first and second output optical power measuring apparatus, and the control apparatus, for:
      determining, from the reference optical power values and the measure of the optical power of signals received by said first and second output optical fibers, first and second optimal beam paths which optimize the optical power of signals received by said first and second output optical fibers; and
      producing an output control signal which may be employed by the control apparatus for the purpose of controlling the beam steering apparatus to achieve the first and second optimal beam paths.

2. The optical system of claim 1, wherein the first and second reference optical power sources are first and second optical power measuring apparatus, respectively, and the first and second reference optical power values are the input optical power of the first and second input optical fibers, respectively.

3. The optical system of claim 1, wherein the signal processing apparatus includes a ratio circuit, and the output control signal is determined so as to maintain a maximum ratio of the output optical power to the reference optical power.

4. The optical system of claim 1, wherein the ratio is greater than one-half.

5. The optical system of claim 1, wherein the output control signal is determined so as to maintain the optical power received by the first and second optical fibers approximately equal.

6. The optical system of claim 1, wherein the output control signal is determined such that the optical power received by the first and second optical fibers are maintain so as not to exceed a preset value.

7. In a system of the type including at least first and second input optical fibers, first and second output optical fibers, a beam steering apparatus, responsive to a control apparatus, for independently steering optical beams produced by the first and second optical fibers to and towards the first and second output optical fibers, an improvement comprising:
   first and second input optical power measuring apparatus for measuring the optical power of signals carried by the first and second input optical fibers, respectively;
   first and second output optical power measuring apparatus for measuring the optical power of signals carried by the first and second output optical fibers, respectively;
   a signal processing apparatus, communicatively coupled to the first and second input optical power measuring apparatus, the first and second output optical power measuring apparatus, and the control apparatus, for:
      determining, from the measure of the optical power of signals carried by the first and second input optical fibers and the measure of the optical power of signals carried by said first and second output optical fibers, first and second optimal beam paths which optimize the optical power of signals carried by said first and second output optical fibers; and
      producing an output signal which may be employed by the control apparatus for the purpose of controlling the beam steering apparatus to achieve the first and second optimal beam paths.

8. In the system of claim 7, the improvement further comprising the signal processing apparatus determining the optimal beam paths to correspond to minimized loss between the optical power of signals carried by the first and second input optical fibers and the optical power of signals carried by the first and second output optical fibers.

9. In the system of claim 7, the improvement further comprising the signal processing apparatus determining the optimal beam paths to correspond to a balanced loss between the optical power of signals carried by the first and second output optical fibers.

10. The improvement of claim 7, wherein the first and second input optical power measuring apparatus are communicatively coupled to the first and second input optical fibers, respectively, for measuring the optical power of signals carried by the first and second input optical fibers.

11. The improvement of claim 7, wherein the first and second output optical power measuring apparatus are communicatively coupled to the first and second output optical fibers, respectively, for measuring the optical power of signals carried by the first and second input optical fibers.

* * * * *